Oct. 23, 1923.
P. E. DIEDERICH
VISOR ATTACHMENT FOR WINDSHIELDS
Filed March 26, 1921
1,471,723
2 Sheets-Sheet 1
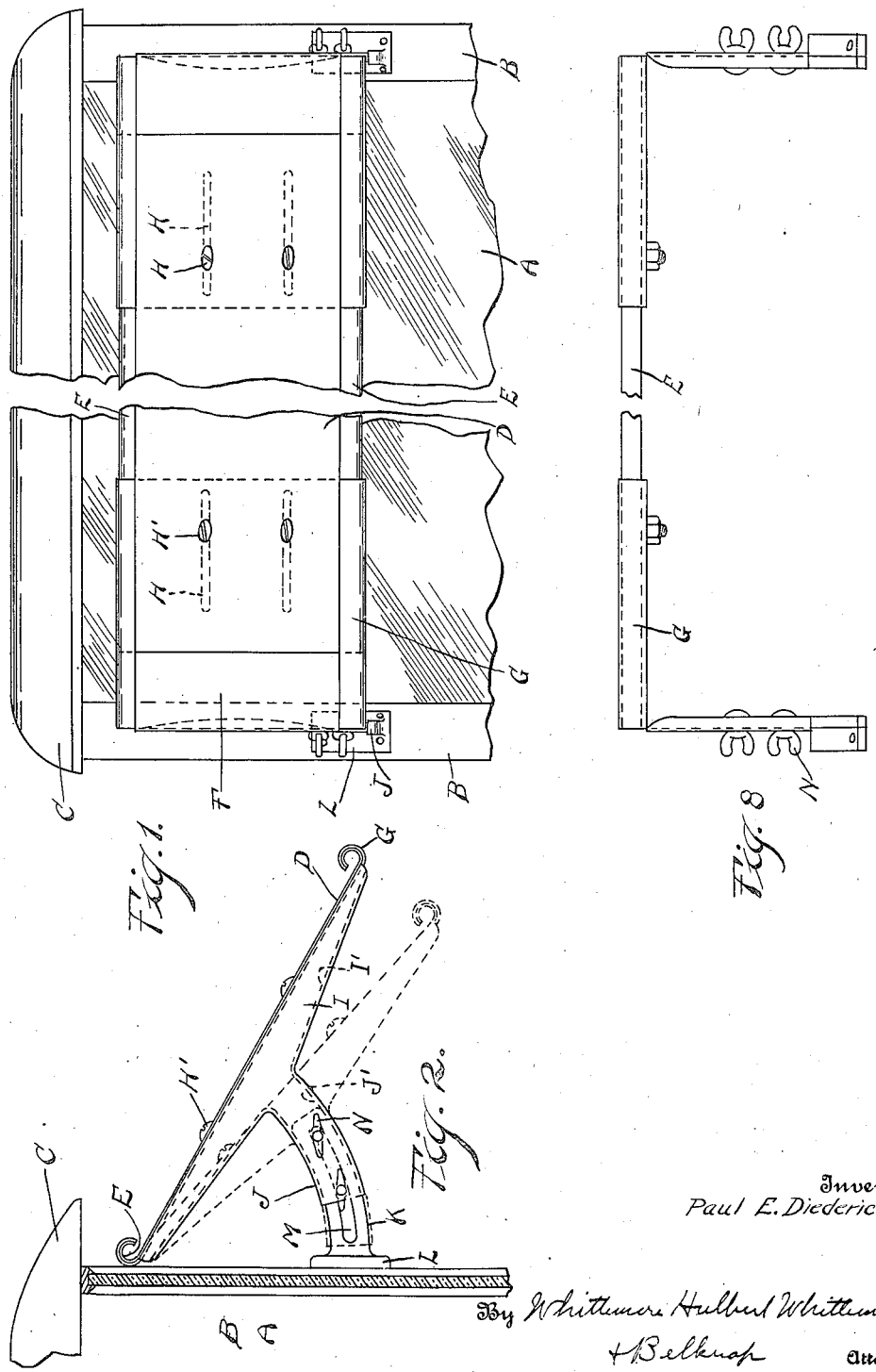
Inventor
Paul E. Diederich Oct. 23, 1923.
P. E. DIEDERICH
VISOR ATTACHMENT FOR WINDSHIELDS
Filed March 26, 1921
1,471,723
2 Sheets-Sheet 2
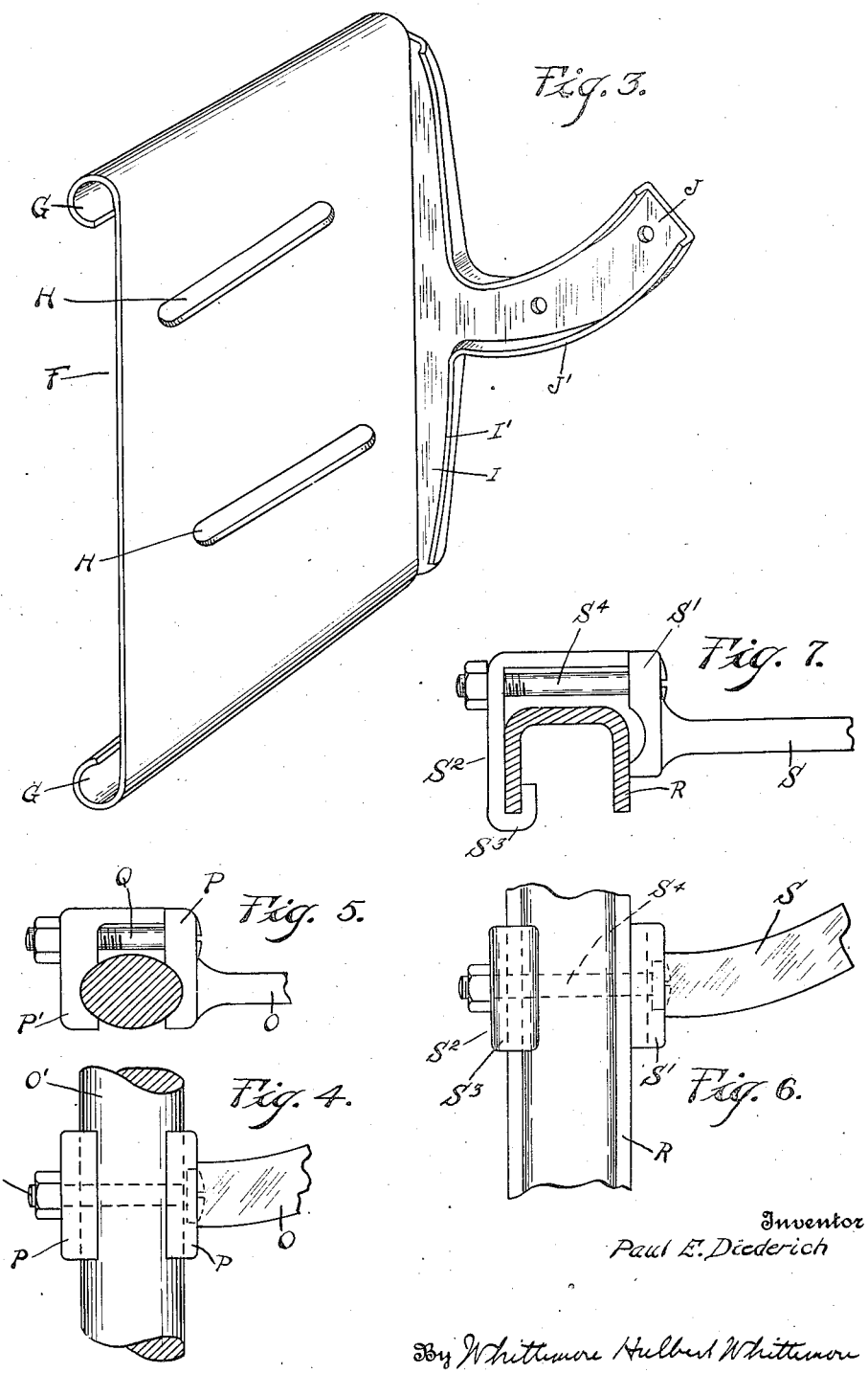
Inventor
Paul E. Diederich
By Whittemore Hulbert Whittemore
+Belknap    Attorneys Patented Oct. 23, 1923.

1,471,723

UNITED STATES PATENT OFFICE.

PAUL E. DIEDERICH, OF DETROIT, MICHIGAN, ASSIGNOR TO MOTOR PRODUCTS CORPORATION, OF DETROIT, MICHIGAN, A CORPORATION OF NEW YORK.

VISOR ATTACHMENT FOR WINDSHIELDS.

Application filed March 26, 1921. Serial No. 455,713.

*To all whom it may concern:*

Be it known that I, PAUL E. DIEDERICH, a citizen of the United States of America, residing at Detroit, in the county of Wayne and State of Michigan, have invented certain new and useful Improvements in Visor Attachments for Windshields, of which the following is a specification, reference being had therein to the accompanying drawings.

This invention relates to visor attachments for windshields, such as are mounted at an inclination in front of the upper portion of a windshield, serving both to deflect rain from the windshield in wet weather, and to shield the eyes of the driver of the vehicle against the glare of sunlight in fine weather.

It is the object of the invention to provide a windshield attachment of the character described, employing largely a sheet metal construction, and making provision for an adjustment to accommodate the visor to various widths of motor vehicles, and also for adjusting said visor at various inclinations to the shield.

In the drawings:

Figure 1 is a front view of a closed car windshield having the herein described visor attachment associated therewith;

Figure 2 is a view showing the windshield in section, and the visor in end elevation;

Figure 3 is a perspective view of one of the end sections of the visor, and the supporting arm which is integrated therewith;

Figure 4 is a fragmentary side view of the windshield standard of a commonly used type of windshield standard for open cars, showing a modified form of a bracket secured to said standard to carry the improved visor;

Figure 5 is a cross-section view through said standard showing the bracket in top plan;

Figure 6 is a view similar to Figure 4 and showing in side elevation another common type of windshield standard for open cars;

Figure 7 is a combined sectional and top plan view thereof similar to Figure 5;

Figure 8 is a side elevation of the visor attachment.

In these views the reference character A designates the windshield of a closed motor vehicle engaging at each side the posts B of the vehicle body, the front portion of the vehicle top being designated at C. The visor, which the present invention provides, comprises a rectangular sheet metal plate D having the rolled top and bottom edges E, and a pair of end plates F overlapping the respective extremities of the plate D, and having the rolled top and bottom edges G telescopically engaging the edges E of the plate D. Thus the three plates D and F form a visor which is adapted to be adjusted in width to accommodate different sizes of motor vehicles, provision being made for maintaining any adjustment by slotting the end plates F horizontally as indicated at H, and engaging in the slots H clamping screws H', carried by the end portion of the plate D. The plates F are re-enforced by rearwardly projecting flanges I at their remote edges, the flanges I being flanged at their rear edges as indicates at I'. An arcuate supporting arm J is formed integral with each flange I intermediate the length thereof, the flanges I' being extended marginally upon the arm J, as indicated at J', to re-enforce said arm. The arms J are adapted to be mounted upon correspondingly curved brackets K respectively secured to the posts B, and preferably formed with terminal supporting plates L engaging said posts, said brackets being proportioned to engage between the flanges J' of the arms J. As a provision for varying the angle of inclination of the visor, the arms J are adjustable longitudinally upon the brackets K, this provision consisting in a pair of clamping screws N mounted upon each arm J and engaging an arcuate slot M' in the corresponding bracket K. Thus in Figure 2 the visor is shown in full lines occupying its position of maximum inclination, and a minimum inclination of the visor is shown in dash lines in said figure.

The modification shown in Figures 4 and 5 illustrates a bracket member O which will be substituted for the described bracket K in applying the described visor to an open type of automobile having a windshield standard O' of oval cross section. The arm O is formed with an end clamping plate P which coacts with a clamping plate P', the clamping stress being applied by one or more bolts Q connecting the plates P and P'.

In the construction shown in Figures 6 and 7 a windshield standard R of channel shape cross section is engaged by the bracket arm J having an end clamping plate S' co-acting with a clamping plate S² hooked as indicated at S³ to engage one of the flanges of said standard, the clamping stress being applied by a bolt S⁴.

The described visor attachment being formed of sheet metal is both durable and inexpensive and provides in a very simple manner for accommodation to various widths of vehicles, as well as for regulating the inclination of the visor. The formation of the supporting arms J of the visor of sheet metal integrated with the end plates F simplifies manufacture and reduces the cost thereof. It is to be observed that the arc jointly formed by the bracket members K and arms J has its center adjacent the top of the windshield, so that the relative adjustment of said arms and brackets effects a change of inclination of the visor, without shifting the upper edge thereof away from the windshield.

What I claim as my invention is:

1. A visor attachment for windshields comprising a visor proper formed of sheet metal and having a length substantially equal to the windshield width, a pair of integral arcuate arms rearwardly projecting from the visor at each end thereof, and a pair of arcuate brackets mounted upon the front of a vehicle at each side thereof, telescopically engaging said arms, and said brackets and said arms forming the sole supporting means for said visor proper, means for clamping said arms to said brackets in various positions of telescopic adjustment.

2. A visor attachment for windshields comprising a center plate, a pair of end plates adjustably engaged by said center plate, integral supporting arms rearwardly projecting from said end plates and of channel shape cross section, and bracket members mounted upon a vehicle at each side of the windshield thereof engaging within said supporting arms and adjustably secured thereto, said bracket members and said arms forming the sole supporting means for said plates.

3. A visor attachment for vehicles comprising a visor proper, a pair of integral arms projecting from said visor proper, a pair of brackets mounted upon said vehicle and telescopically engaging said arms, said brackets and said arms forming the sole supporting means for said visor proper, and means for retaining said arms in adjusted position with respect to said brackets.

In testimony whereof I affix my signature.

PAUL E. DIEDERICH.